US012399344B2

United States Patent
Dhanda et al.

(10) Patent No.: US 12,399,344 B2
(45) Date of Patent: Aug. 26, 2025

(54) ACTIVE DEFOCUS FOR DISPLAY ASSEMBLY

(71) Applicant: Meta Platforms Technologies, LLC, Menlo Park, CA (US)

(72) Inventors: Abhishek Dhanda, San Ramon, CA (US); Honghong Peng, Los Altos, CA (US); Kenneth Alexander Diest, Kirkland, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 176 days.

(21) Appl. No.: 18/201,547

(22) Filed: May 24, 2023

(65) Prior Publication Data

US 2024/0361566 A1    Oct. 31, 2024

Related U.S. Application Data

(60) Provisional application No. 63/462,920, filed on Apr. 28, 2023.

(51) Int. Cl.
*G02B 7/02* (2021.01)
*G02B 7/08* (2021.01)
(Continued)

(52) U.S. Cl.
CPC ............... *G02B 7/028* (2013.01); *G02B 7/08* (2013.01); *G02B 27/0172* (2013.01); *G09G 3/002* (2013.01); *H04N 23/55* (2023.01); *H04N 23/57* (2023.01); *G02B 2027/0138* (2013.01); *G02B 2027/014* (2013.01)

(58) Field of Classification Search
CPC ...... G02B 7/028; G02B 7/08; G02B 27/0172; G02B 2027/0138; G02B 2027/014; G02B 7/09; G02B 7/282; G02B 27/0025; G09G 3/002; H04N 23/55; H04N 23/57
See application file for complete search history.

(56) References Cited

U.S. PATENT DOCUMENTS 8,305,438 B2 * 11/2012 Greenhill ............... G08B 29/14
348/175
11,202,043 B1    12/2021 Tamer et al.
(Continued)

OTHER PUBLICATIONS

Punnappurath, A., Abuolaim, A., Afifi, M., & Brown, M. S. (Apr. 2020). Modeling defocus-disparity in dual-pixel sensors. In 2020 IEEE International Conference on Computational Photography (ICCP) (pp. 1-12). IEEE.*

(Continued)

*Primary Examiner* — Sarah Lhymn
(74) *Attorney, Agent, or Firm* — Freestone Intellectual Property Law PLLC; Aaron J. Visbeek

(57) ABSTRACT

An adjustment image of a projected image is captured by a disparity image sensor. A first defocus factor in generated response to comparing the adjustment image with a reference image driven onto a display projector assembly the generated the projected image. A second defocus factor is generated in response to an alignment of a first intensity profile of the adjustment image and a second intensity profile of the adjustment image. A focusing lens of the display projector assembly is adjusted in response to at least one of the first defocus factor and the second defocus factor.

20 Claims, 8 Drawing Sheets

(51) Int. Cl.
    *G02B 27/01*     (2006.01)
    *G09G 3/00*     (2006.01)
    *H04N 23/55*     (2023.01)
    *H04N 23/57*     (2023.01)

(56) References Cited

U.S. PATENT DOCUMENTS

| | | | | |
|---|---|---|---|---|
| 2006/0067663 | A1* | 3/2006 | Kita | G02B 26/005 |
| | | | | 348/E5.045 |
| 2015/0312488 | A1* | 10/2015 | Kostrzewa | H04N 25/677 |
| | | | | 348/164 |
| 2015/0312489 | A1* | 10/2015 | Hoelter | H04N 25/683 |
| | | | | 348/164 |
| 2016/0150154 | A1 | 5/2016 | Yu et al. | |
| 2017/0359522 | A1* | 12/2017 | Park | H04N 23/67 |
| 2018/0152618 | A1* | 5/2018 | Wei | H04N 23/672 |
| 2018/0292670 | A1* | 10/2018 | Takahashi | G03B 13/36 |
| 2019/0075233 | A1* | 3/2019 | Galor Gluskin | H04N 25/703 |
| 2020/0378759 | A1* | 12/2020 | Suto | G01C 3/32 |
| 2022/0132079 | A1* | 4/2022 | Choi | H04N 25/78 |
| 2023/0085129 | A1 | 3/2023 | Jeong et al. | |

OTHER PUBLICATIONS

Abuolaim, A., Delbracio, M., Kelly, D., Brown, M. S., & Milanfar, P. (2021). Learning to reduce defocus blur by realistically modeling dual-pixel data. In Proceedings of the IEEE/CVF International Conference on Computer Vision (pp. 2289-2298).*

Jung, S. H., & Heo, Y. S. (Oct. 2021). Disparity probability volume guided defocus deblurring using dual pixel data. In 2021 International Conference on Information and Communication Technology Convergence (ICTC) (pp. 305-308). IEEE.*

Ebner C., et al., "Video See-Through Mixed Reality with Focus Cues," IEEE Transactions on Visualization and Computer Graphics, Feb. 15, 2022, vol. 28, No. 5, pp. 2256-2266.

European Search Report for European Patent Application No. 24162615.9, dated Jul. 26, 2024, 7 pages.

* cited by examiner

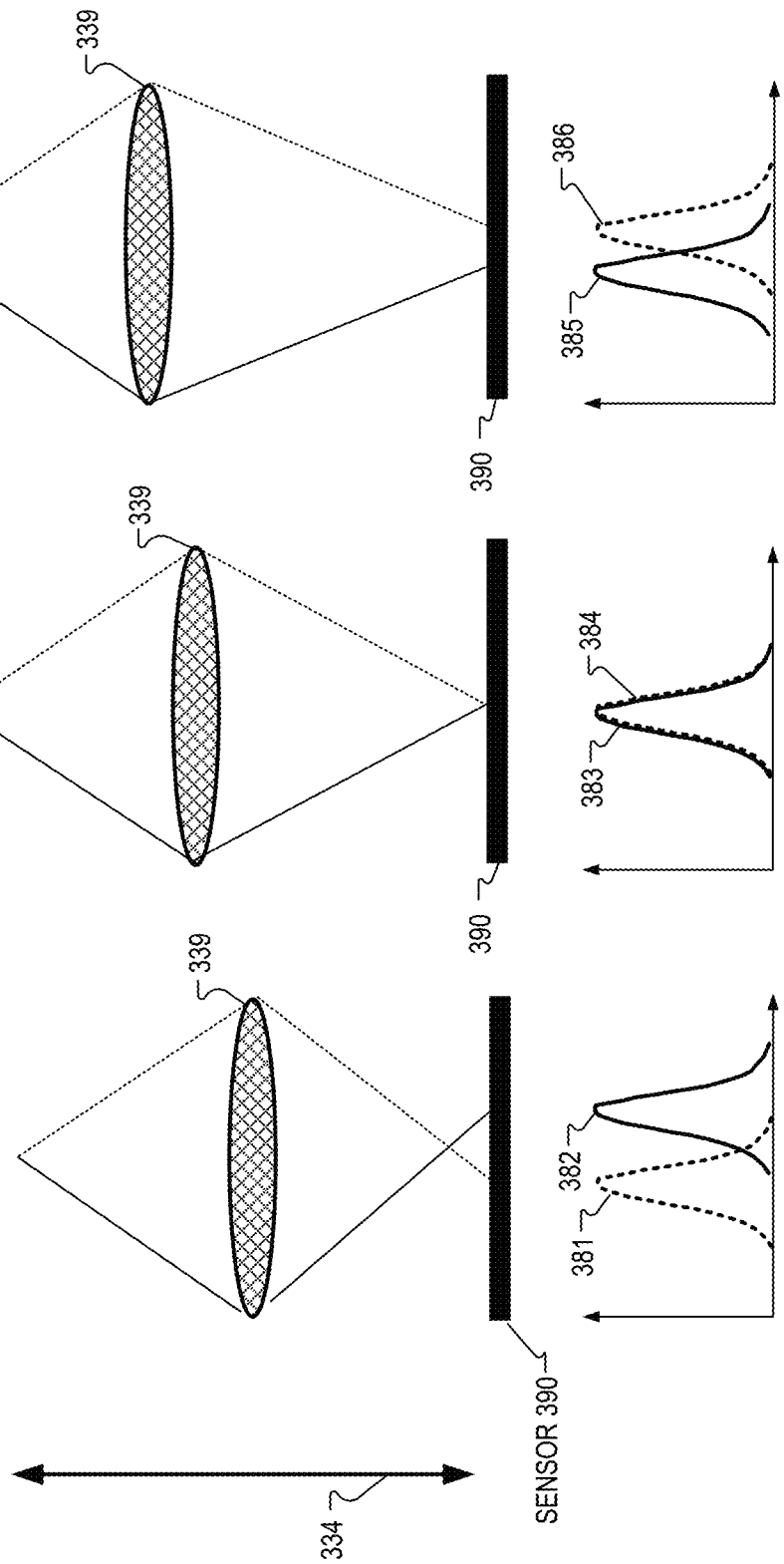

ACTIVE DEFOCUS FOR DISPLAY ASSEMBLY

CROSS-REFERENCE TO RELATED APPLICATIONS

This application claims priority to U.S. provisional Application No. 63/462,920 filed Apr. 28, 2023, which is hereby incorporated by reference.

TECHNICAL FIELD

This disclosure relates generally to optics, and in particular to displays.

BACKGROUND INFORMATION

Optical lenses are used to focus display light and also used to focus image light onto image sensors for imaging purposes. The focus of an optical lens may change with temperature. Furthermore, manufacturing tolerances of the lenses themselves or the alignment of lenses in a lens assembly may also contribute to unwanted performance variance.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIG. 3D-3F illustrates different intensity profiles from the dual photodiodes with respect to a focusing distance of a lens adjusted along a z-axis of the imaging system, in accordance with aspects of the disclosure.

DETAILED DESCRIPTION

Figure 1:
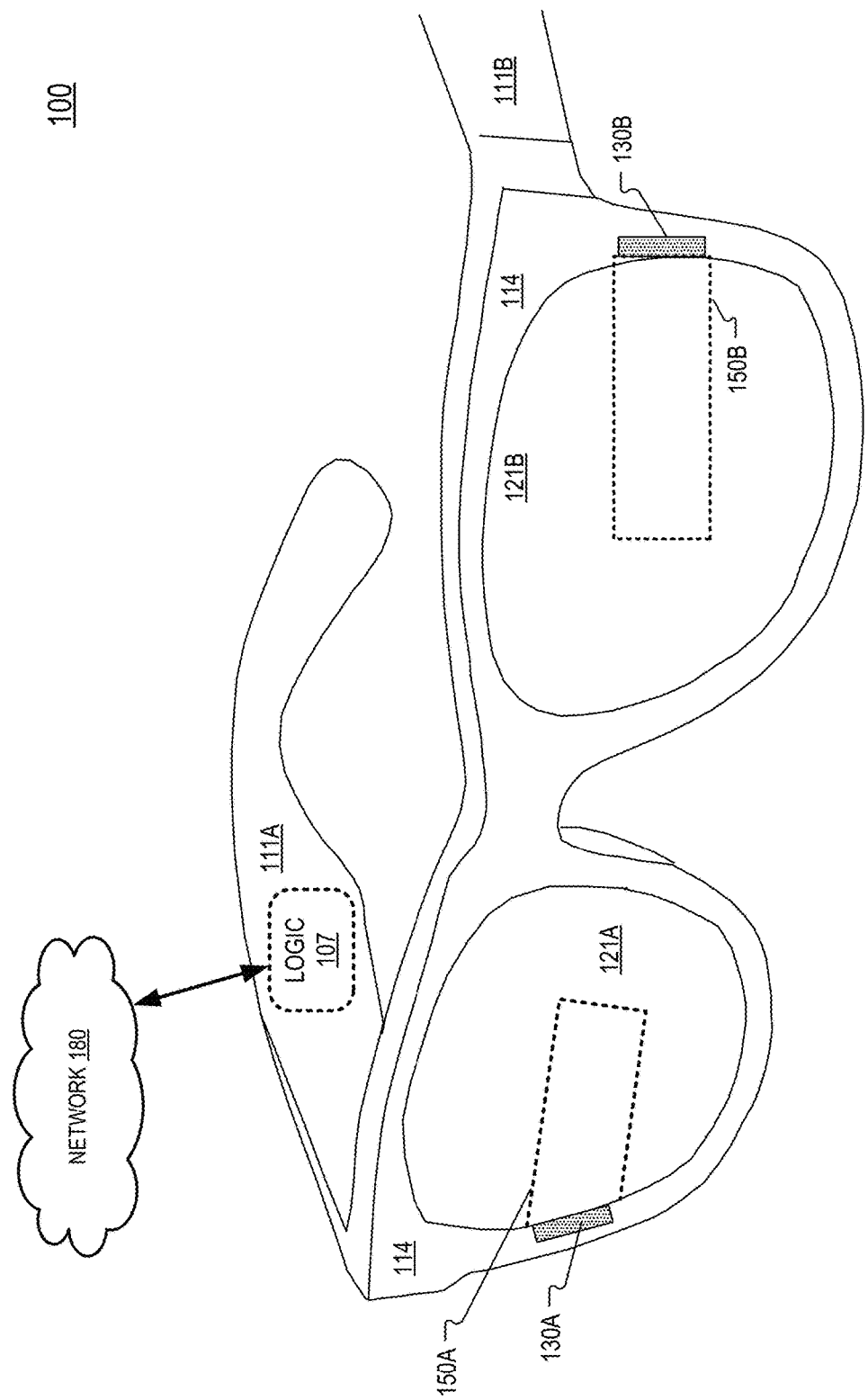
FIG. 1 illustrates a head mounted display (HMD) that may include a display assembly with an adjustable focusing lens, in accordance with aspects of the disclosure.

Embodiments of active defocusing for a display assembly are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In some implementations of the disclosure, the term "near-eye" may be defined as including an element that is configured to be placed within 50 mm of an eye of a user while a near-eye device is being utilized. Therefore, a "near-eye optical element" or a "near-eye system" would include one or more elements configured to be placed within 50 mm of the eye of the user.

In aspects of this disclosure, visible light may be defined as having a wavelength range of approximately 380 nm-700 nm. Non-visible light may be defined as light having wavelengths that are outside the visible light range, such as ultraviolet light and infrared light. Infrared light having a wavelength range of approximately 700 nm-1 mm includes near-infrared light. In aspects of this disclosure, near-infrared light may be defined as having a wavelength range of approximately 700 nm-1.6 μm.

In aspects of this disclosure, the term "transparent" may be defined as having greater than 90% transmission of light. In some aspects, the term "transparent" may be defined as a material having greater than 90% transmission of visible light.

Display projector assemblies include focusing lenses to focus the display light. One way to increase brightness in a display projector assembly is to utilize a "faster" focusing lens with a smaller F-stop. However, these faster lenses also have a smaller depth of field that makes it more sensitive to focal length as a function of temperature. Additionally, coefficient of thermal expansion (CTE) mismatches in lens element in the focusing lens assembly may cause focal length shifts with temperatures. Furthermore, factory tolerances and manufacturing alignment tolerances may also have an impact on the system focusing performance of the system. Thus, focusing the display projector assembly with faster lenses that increase brightness may use enhanced defocusing adjustment to assist in improving the display of images.

Implementations of the disclosure include adjusting a focusing lens of a display assembly in response to multiple defocus factors. A content-based defocus factor may be generated in response to compare an adjustment image (captured by an image sensor) with a reference image that was actually driven onto the display assembly. A dual-photodiode defocus factor may be generated in response to an alignment of a first intensity profile of the adjustment image and a second intensity profile of the adjustment image that is captured by the dual-photodiode disparity image sensor. These and other embodiments are described in more detail in connection with FIGS. 1-7.

FIG. 1 illustrates a head mounted display (HMD) 100 that may include a display assembly with an adjustable focusing lens, in accordance with aspects of the present disclosure. HMD 100 includes frame 114 coupled to arms 111A and 111B. Lens assemblies 121A and 121B are mounted to frame 114. Lens assemblies 121A and 121B may include a prescription lens matched to a particular user of HMD 100. The illustrated HMD 100 is configured to be worn on or about a head of a wearer of HMD 100.

In the HMD 100 illustrated in FIG. 1, each lens assembly 121A/121B includes a display waveguide 150A/150B to direct image light generated by display projector assemblies 130A/130B to an eyebox region for viewing by a user of HMD 100. Display projector assemblies 130A/130B may include a beam-scanning display that includes a scanning mirror, for example. Display projector assemblies 130A/130B may include one or more light sources such as a red, green, and blue light source.

Lens assemblies 121A and 121B may appear transparent to a user to facilitate augmented reality or mixed reality to enable a user to view scene light from the environment around them while also receiving display light directed to their eye(s) by, for example, waveguides 150A/150B. Lens assemblies 121A and 121B may include two or more optical layers for different functionalities such as display, eye-tracking, face tracking, and optical power. In some embodiments, display light from display projector assemblies 130A or 130B is only directed into one eye of the wearer of HMD 100. In an embodiment, both display projector assemblies 130A and 130B are used to direct image light into waveguides 150A and 150B, respectively.

Frame 114 and arms 111A/111B may include supporting hardware of HMD 100 such as processing logic 107, wired and/or wireless data interface for sending and receiving data, graphic processors, and one or more memories for storing data and computer-executable instructions. Processing logic 107 may include circuitry, logic, instructions stored in a machine-readable storage medium, ASIC circuitry, FPGA circuitry, and/or one or more processors. In one embodiment, HMD 100 may be configured to receive wired power. In one embodiment, HMD 100 is configured to be powered by one or more batteries. In one embodiment, HMD 100 may be configured to receive wired data including video data via a wired communication channel. In one embodiment, HMD 100 is configured to receive wireless data including video data via a wireless communication channel.

Processing logic 107 is illustrated as included in arm 111A of HMD 100, although processing logic 107 may be disposed anywhere in the frame 114 or arms 111A/111B of HMD 100. Processing logic 107 may be communicatively coupled to wired or wireless network 180. Processing logic 107 may be configured to adjust a focusing lens of display projector assemblies 130A and/or 130B in response to defocus factors.

Figure 2:
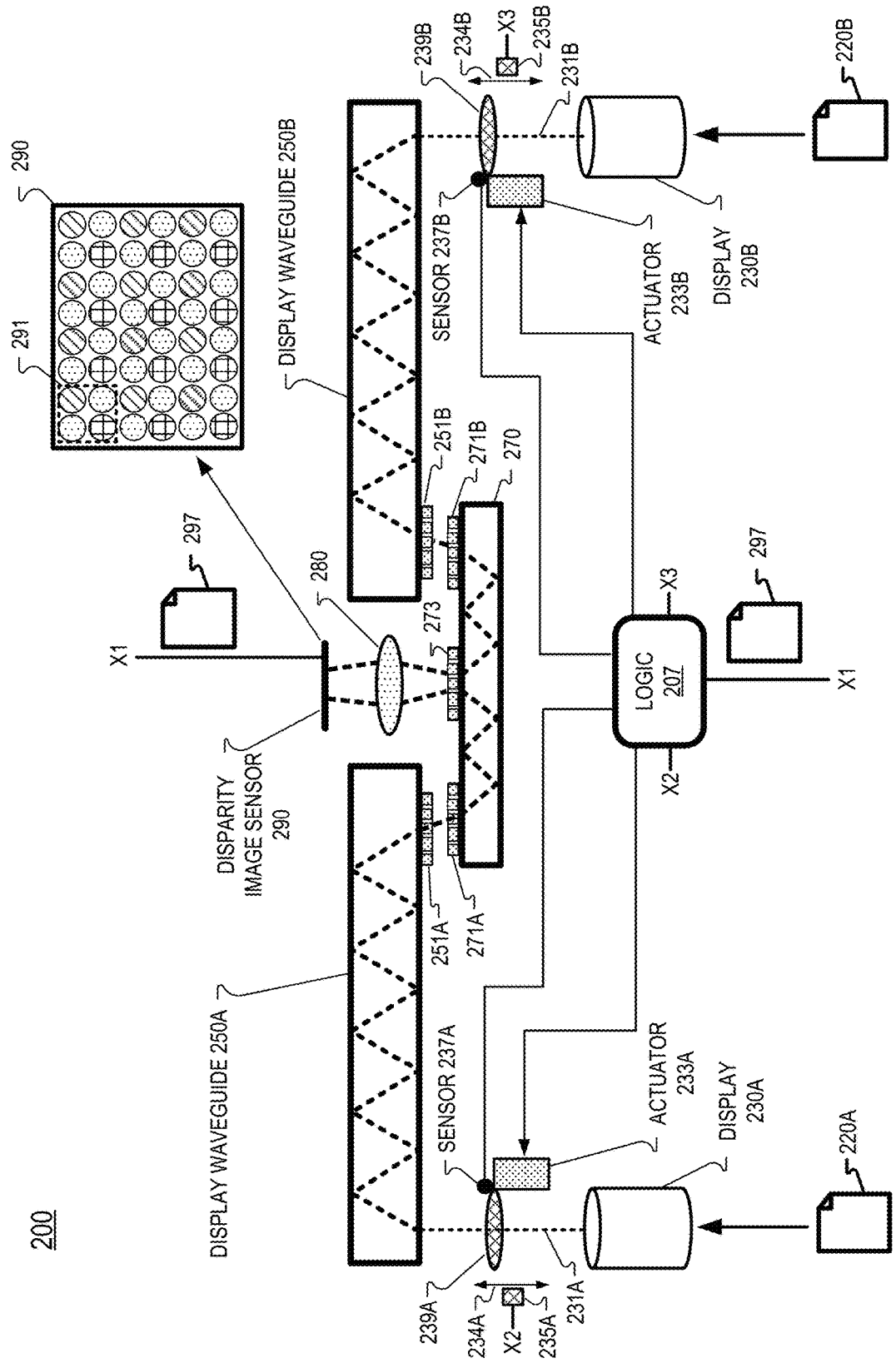
FIG. 2 illustrates an example display assembly having active defocus capability that may be included in an HMD, in accordance with aspects of the disclosure.

FIG. 2 illustrates an example display assembly 200 having active defocus capability that may be included in an HMD such as HMD 100, in accordance with aspects of the disclosure. Display assembly 200 includes two display waveguides 250A and 250B and a disparity image sensor 290 configured to receive a portion of the image light in display waveguide 250A and 250B by way of disparity waveguide 270.

An example left display projector assembly may include display 230A and focusing lens 239A that can be adjusted along z-axis 234A to provide defocusing functionality to the display projector assembly. Z-axis 234A may correspond to an optical axis of image light emitted by display 230A and actuator 233A is configured to adjust focusing lens 239A along positions of z-axis 234A. Actuator 233A may include a micro-electro-mechanical systems (MEMS) actuator or a piezo device, for example. Processing logic 207 may be configured to drive actuator 233A in response to one or more defocus factors. A position sensor 235A may generate a positional signal that indicates a position of focusing lens 239A and provide the position signal to processing logic 207 by way of communication channel X2. In the illustrated implementation, a temperature sensor 237A is configured to generate a thermal reading of focusing lens 239A of the display projector assembly and provide the thermal reading to processing logic 207.

In operation, an image 220A is driven onto display 230A and display 230A generates image light 231A to direct into display waveguide 250A for presenting a virtual image to an eyebox region. The image light 231A may be confined to propagate within display waveguide 250A by way of total internal reflection (TIR) or otherwise. The image light is outcoupled (not specifically illustrated) from display waveguide 250A to present a virtual image to an eyebox region. An outcoupling element (not illustrated) such a grating or a holographic optical element (HOE) may be used to outcouple the image light to the eyebox region, for example.

In FIG. 2, at least a portion of the image light propagating in display waveguide 250A is outcoupled into disparity waveguide 270. Outcoupler 251A outcouples the image light from display waveguide 250A and incoupler 271A incouples the image light into disparity waveguide 270. The image light propagates in disparity waveguide until it is outcoupled by outcoupler 273 where camera lens assembly 280 focuses the image light to an imaging plane of disparity image sensor 290. Disparity image sensor 290 captures an adjustment image 297 from the image light. Disparity image sensor 290 may include a complementary metal-oxide semiconductor (CMOS) image sensor, for example.

Disparity image sensor 290 also receives image light from a second display project assembly in the illustrated implementation of FIG. 2. The second display projector assembly includes display 230B and focusing lens 239B and operates similarly to the first display projector assembly on the left side of FIG. 2.

Example right display projector assembly may include display 230B and focusing lens 239B that can be adjusted along z-axis 234B to provide defocusing functionality to the display projector assembly. Z-axis 234B may correspond to an optical axis of image light emitted by display 230B and actuator 233B is configured to adjust focusing lens 239B along positions of z-axis 234B. Actuator 233B may include a micro-electro-mechanical systems (MEMS) actuator or a piezo device, for example. Processing logic 207 may be configured to drive actuator 233B in response to one or more defocus factors. A position sensor 235B may generate a positional signal that indicates a position of focusing lens 239B and provide the position signal to processing logic 207 by way of communication channel X3. In the illustrated implementation, a temperature sensor 237B is configured to generate a thermal reading of focusing lens 239B of the right display projector assembly and provide the thermal reading to processing logic 207.

In operation, an image 220B is driven onto display 230B and display 230B generates image light 231B to direct into display waveguide 250A for presenting a virtual image to an eyebox region. The image light 231B may be confined to propagate within display waveguide 250B by way of total internal reflection (TIR) or otherwise. The image light is outcoupled (not specifically illustrated) from display waveguide 250B to present a virtual image to an eyebox region. An outcoupling element (not illustrated) such a grating or a holographic optical element (HOE) may be used to outcouple the image light to the eyebox region, for example.

In FIG. 2, at least a portion of the image light propagating in display waveguide 250B is outcoupled into disparity waveguide 270. Outcoupler 251B outcouples the image light from display waveguide 250B and incoupler 271B incouples the image light into disparity waveguide 270. The image light propagates in disparity waveguide until it is outcoupled by outcoupler 273 where camera lens assembly 280 focuses the image light to an imaging plane of disparity image sensor 290.

The adjustment image 297 captured by disparity image sensor 290 may include a portion of the image light 231A from display waveguide 250A and a portion of the image light 231B from display waveguide 250B.

Figure 3A:
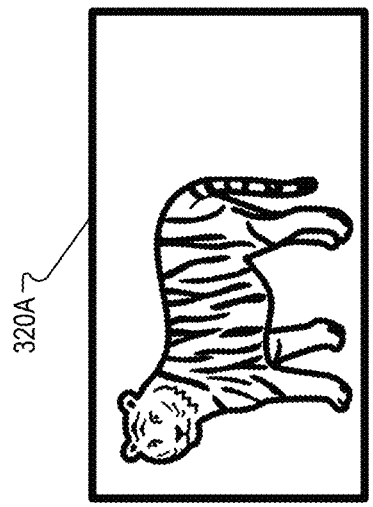
FIGS. 3A-3C illustrate example virtual images and an example adjustment image captured by a disparity image sensor, in accordance with aspects of the disclosure.
Figure 3B:
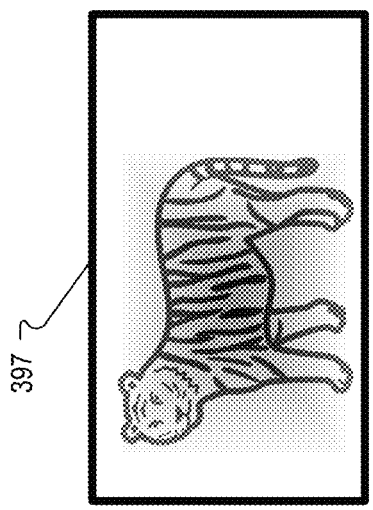
Figure 3C:
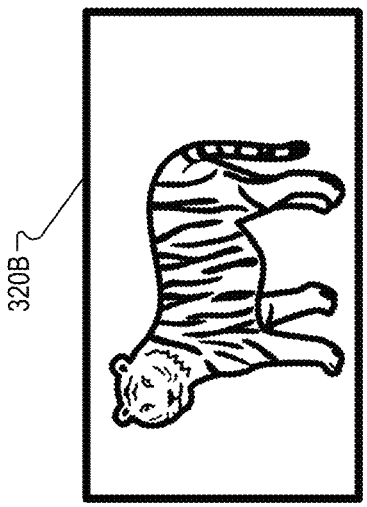

FIG. 3A illustrates an example of a virtual image 320A that may be driven onto display 230A as image 220A. FIG. 3C illustrates an example of a virtual image 320B that may be driven onto display 230B as image 220B. FIG. 3B illustrates an example adjustment image 397 captured by disparity image sensor 290. The example adjustment image 397 is illustrated as a slightly out of focus and blurred image of a tiger. Adjustment image 397 is an example of the adjustment image 297 that may be captured by disparity image sensor 290. When focusing lenses 239A and 239B are properly focused, adjustment image 297/397 will be in focus and not blurry.

Referring again to FIG. 2, processing logic 207 is configured to receive adjustment image 297 by way of communication channel X1. Processing logic 207 may adjust focusing lens 239A and/or 239B in response to adjustment image 297.

In an implementation, processing logic 207 generates a content-based defocus factor in response to comparing adjustment image 297 to a reference image (e.g. image 220A or 220B) that was driven onto a display projector assembly to compare the expected image (the reference image) with the actual image being displayed (the adjustment image). In one implementation, generating the content-based defocus factor includes computing a relative peak signal-to-noise ratio (PSNR) between the adjustment image and the reference image and then deriving the content-based defocus factor from the relative PSNR. In one implementation, generating the content-based defocus factor includes computing a mean-square error (MSE) between the adjustment image and the reference image and then deriving the content-based defocus factor from the MSE. In one implementation, generating the content-based defocus factor includes computing a structural similarity index measure (SSIM) between the adjustment image and the reference image and then deriving the content-based defocus factor from the SSIM. Other image quality metrics may also be generated and used to generate the content-based defocus factor.

In an implementation, processing logic 207 generates a second defocus factor in response to intensity profiles from a dual-photodiode disparity image sensor that is used as disparity image sensor 290. FIG. 2 illustrates a plan view of a section of an example image sensor 290 having Red-Green-Green-Blue (RGGB) pixels 291. In a dual-photodiode disparity image sensor, each red subpixel includes two adjacent photodiodes configured to sense incident red light, each green subpixel includes two adjacent photodiodes configured to sense incident green light, and each blue subpixel includes two adjacent photodiodes configured to sense incident blue light. Having dual photodiodes in each subpixel allows the dual-photodiode disparity image sensor to provide defocus information from the different intensity profiles generated by the two photodiodes in the subpixels.

FIGS. 3D-3F illustrate different intensity profiles from the dual photodiodes with respect to a focusing distance of a lens 339 adjusted along a z-axis 334 of the imaging system, in accordance with implementations of the disclosure. In FIG. 3D, lens 339 is positioned along z-axis 334 at a distance too close to sensor 390 and therefore does not focus light to the imaging plane of sensor 390. Hence, the first intensity profile 381 is not aligned with the second intensity profile 382. The first intensity profile is generated by first-photodiodes of the dual-photodiode disparity image sensor and the second intensity profile is generated by second-photodiodes of the dual-photodiode disparity image sensor disposed adjacent to the first-photodiodes.

In FIG. 3E lens 339 is positioned along z-axis 334 at a distance that focuses the light to the imaging plane of sensor 390 and the first intensity profile 383 is aligned with the second intensity profile 384. In FIG. 3F, lens 339 is positioned along z-axis 334 at a distance too far from sensor 390 and therefore does not focus light to the imaging plane. Hence, the first intensity profile 385 is not aligned with the second intensity profile 386.

While the optical path between focusing lenses 239A and 239B and disparity image sensor 290 in FIG. 2 is not as direct as the simplified drawings of FIG. 3D-3F, the same principle applies. Thus, the defocus of focusing lenses 239A and 293B can be measured in the captured adjustment image 297 by analyzing an alignment of a first intensity profile of the adjustment image and a second intensity profile of the adjustment image (where the first intensity profile is generated by first-photodiodes of the dual-photodiode disparity image sensor and the second intensity profile is generated by second-photodiodes of the dual-photodiode disparity image sensor 290).

Figure 4:
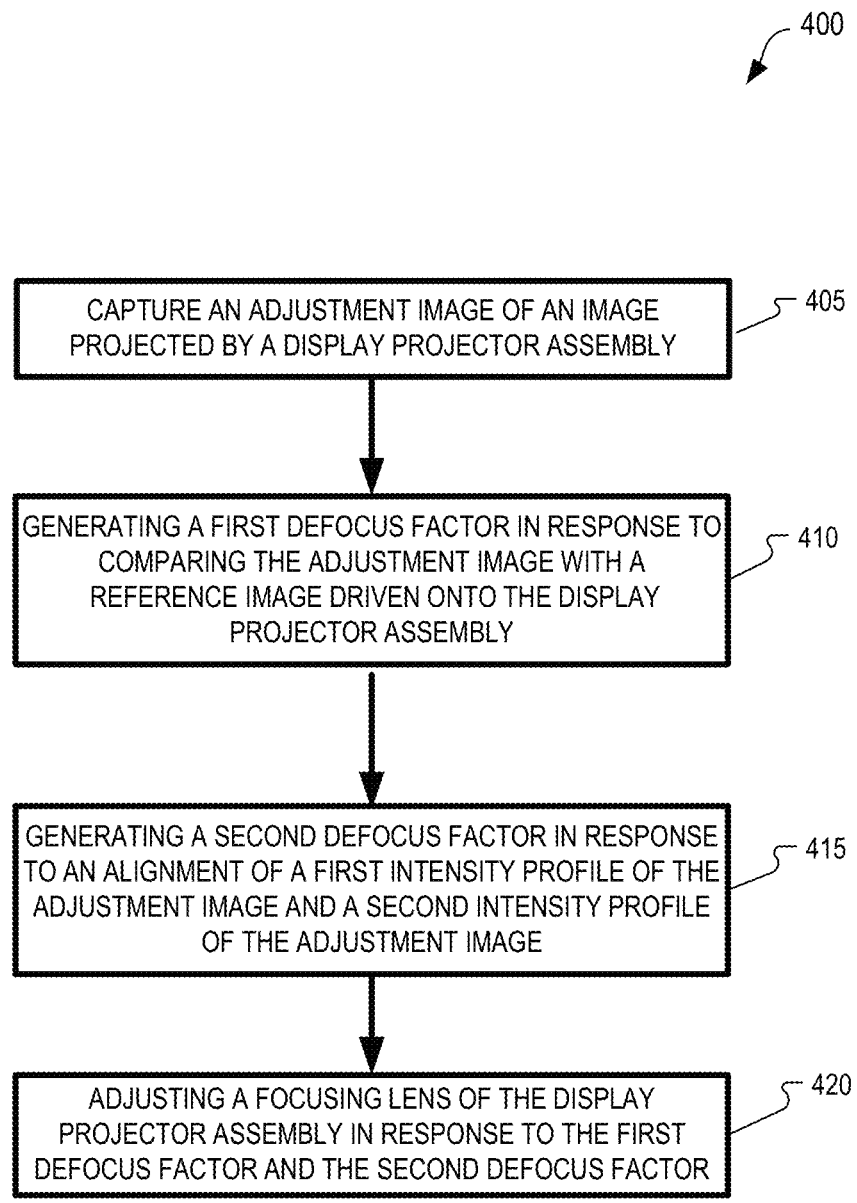
FIG. 4 illustrates a flow chart of an example process of adjusting a focusing lens, in accordance with aspects of the disclosure.

FIG. 4 illustrates a flow chart of an example process 400 of adjusting a focusing lens, in accordance with aspects of the disclosure. The order in which some or all of the process blocks appear in process 400 should not be deemed limiting. Rather, one of ordinary skill in the art having the benefit of the present disclosure will understand that some of the process blocks may be executed in a variety of orders not illustrated, or even in parallel. All or a portion of the process blocks in FIG. 4 may be executed by processing logic 107 or 207.

In process block 405, an adjustment image (e.g. adjustment image 297) is captured. The adjustment image is of an image projected by a display projector assembly. The adjustment image is captured by a dual-photodiode disparity image sensor (e.g. image sensor 290 in some implementations).

In process block 410, a first defocus factor is generated in response to comparing the adjustment image with a reference image driven onto the display projector assembly.

In process block 415, a second defocus factor is generated in response to an alignment of a first intensity profile of the adjustment image and a second intensity profile of the adjustment image. The first intensity profile is generated by first-photodiodes of the dual-photodiode disparity image sensor and the second intensity profile is generated by second-photodiodes of the dual-photodiode disparity image sensor disposed adjacent to the first-photodiodes.

In process block 420, a focusing lens (e.g. focusing lens 239A or 239B) is adjusted in response to the first defocus factor and the second defocus factor. In some implementations, the focusing lens is adjusted in response to only one defocus factor. By adjusting the focusing lens of the display projector assembly, the virtual image directed to the eyebox region can be more closely focused to match the actual image (e.g. 220A or 220B) that is driven onto the display projector assembly.

In an implementation of process 400, a third defocus factor is generated in response to a thermal reading of the focusing lens of the display projector assembly and adjusting the focusing lens of the display projector assembly is also in response to the third defocus factor. In the example of FIG. 2, thermal sensor 237A or 237 B may provide the thermal reading of the focusing lens to processing logic 207.

In an implementation of process 400, the focusing lens of the display projector assembly is also adjusted in response to a position signal generated by a position sensor (e.g. 235A or 235B) that senses a position of the focusing lens (e.g. 239A or 239B) of the display projector assembly.

In an implementation, generating the first defocus factor includes computing a relative peak signal to noise ratio (PSNR) between the adjustment image and the reference image and deriving the first defocus factor from the relative PSNR.

Figure 5:
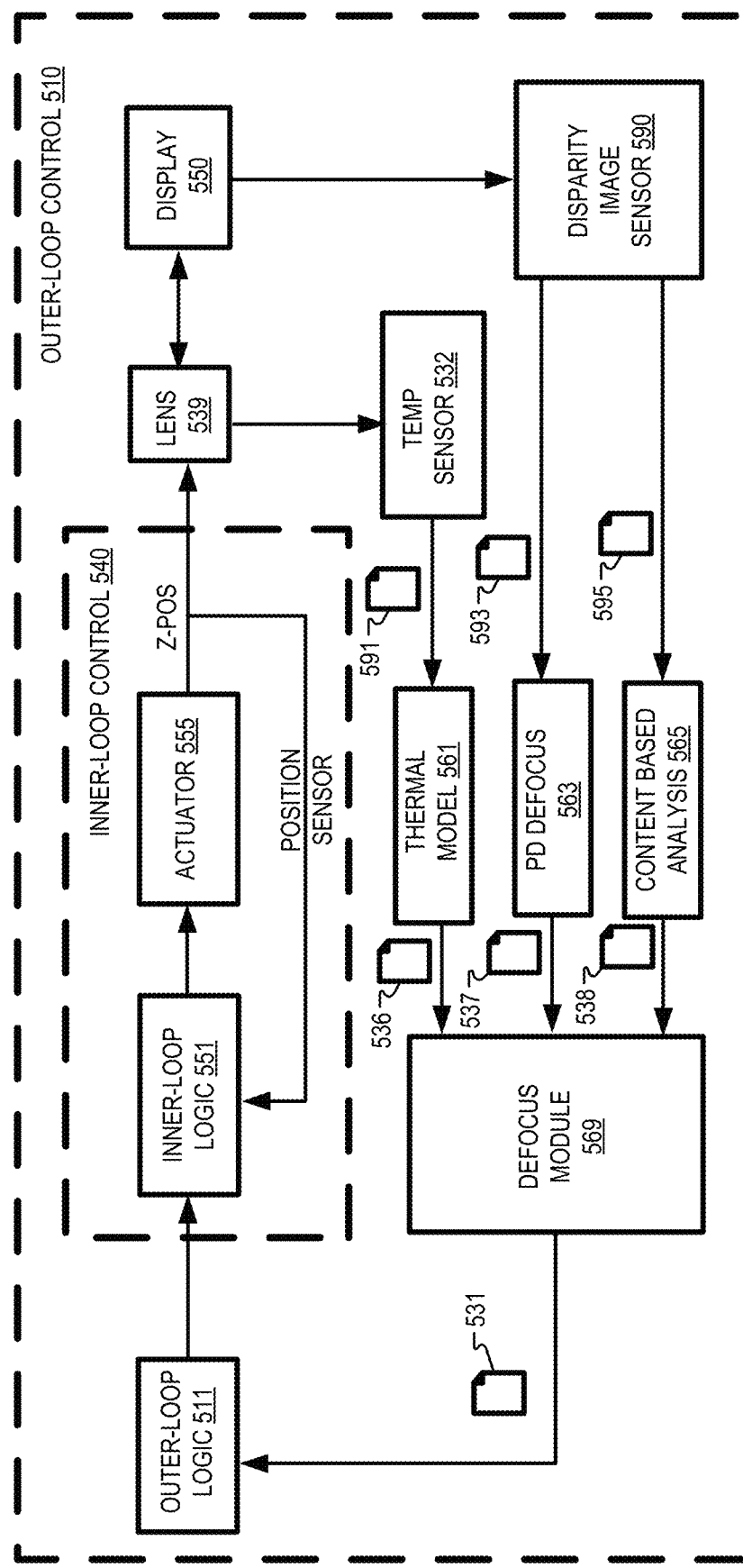
FIG. 5 illustrates an example block diagram of an outer-loop control and an inner-loop control of adjusting a focusing lens, in accordance with aspects of the disclosure.

FIG. 5 illustrates an example block diagram of an outer-loop control 510 and an inner-loop control 540 of adjusting a focusing lens, in accordance with aspects of the disclosure. Inner-loop control 540 includes an actuator 555 and inner-loop logic 551. A position sensor (e.g. position sensor 235) may provide a z-position of lens 539 to inner-loop logic 551. Inner-loop logic 551 drives actuator 555 to adjust focusing lens 539 to a particular z-axis position in response to the position signal and a focus input from outer-loop logic 511. Lens 539 focuses the display light emitted by display 550.

A temperature sensor 532 may sense a thermal reading 591 and provide the thermal reading 591 to thermal model 561. Thermal model 561 may provide a defocus factor 536 to defocus module 569. Thermal model 561 may be a linear model to generate the defocus factor 536. The linear model may be derived from factory calibration involving monitoring defocus over multiple temperature ranges and fitting a polynomial model to the response.

Disparity Image Sensor 590 receives image light from display 550 in order to capture an adjustment image. Dual photodiode defocus data 593 may be provided to Photodiode Defocus module 563 from disparity image sensor 590. Based on intensity profiles of the dual photodiodes in disparity image sensor 590, photodiode defocus module 563 generates defocus factor 537.

The adjustment image that disparity image sensor 590 captures may be sent to content-based analysis module 565 as frame 595. Based on frame 595, content-based analysis module 565 generates defocus factor 538. Content-based analysis module 565 may also receive a reference image that was driven onto display 550 and compare the reference image with frame 595 received from disparity image sensor 590 to generate defocus factor 538.

In FIG. 5, defocus module 569 receives defocus factors 536, 537, and 538 and generates a defocus adjustment command 531 in response to one or more of the defocus factors 536, 537, and 538. Outer-loop logic 511 receives defocus adjustment command 531 and sends it to inner-loop logic 551 as a focus input. Thus, the z-position of lens 539 is influenced by both the inner-loop control 540 and the outer-loop control 510.

Figure 6:
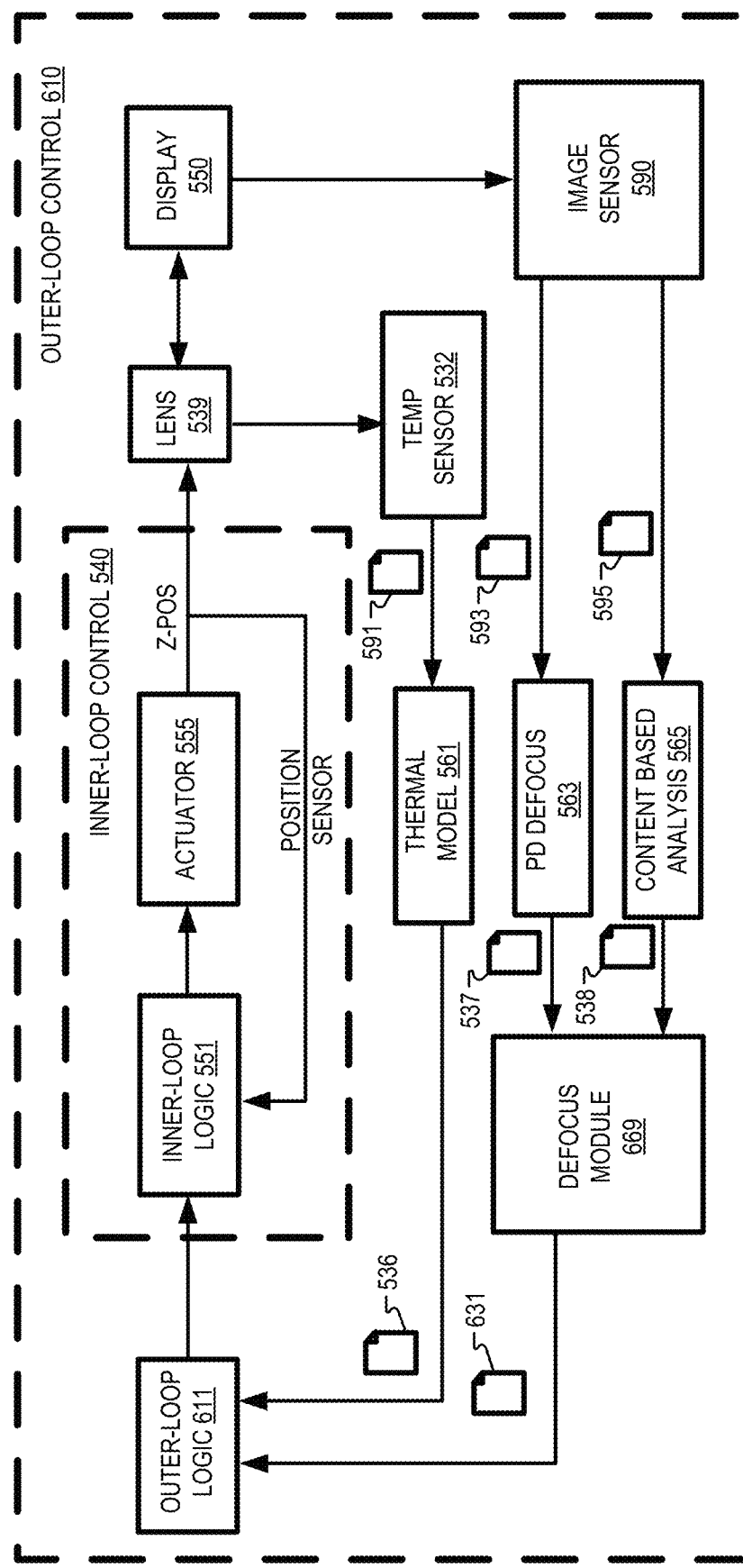
FIG. 6 illustrates an example block diagram of another outer-loop control for adjusting a focusing lens, in accordance with aspects of the disclosure.

FIG. 6 illustrates an example block diagram of an outer-loop control 610 for adjusting a focusing lens, in accordance with aspects of the disclosure. Outer-loop control 610 differs from outer-loop control 510 in that the defocus factor 536 from thermal model 561 is fed forward to outer-loop logic 611 and defocus module 669 receives defocus factors 537 and 538. Defocus module 669 receives defocus factors 537 and 538 and generates a defocus adjustment command 631 in response to one or more of the defocus factors 537 and 538. Outer-loop logic 611 generates its focus input for providing to inner-loop logic 551 in response to defocus factor 536 and defocus adjustment command 631. The example architecture of FIG. 6 may offer improved dynamic performance as feedback from defocus factors 537 and 538 may only present smaller residual focusing errors compared to a dominant defocus estimation based on thermal modeling.

Figure 7:
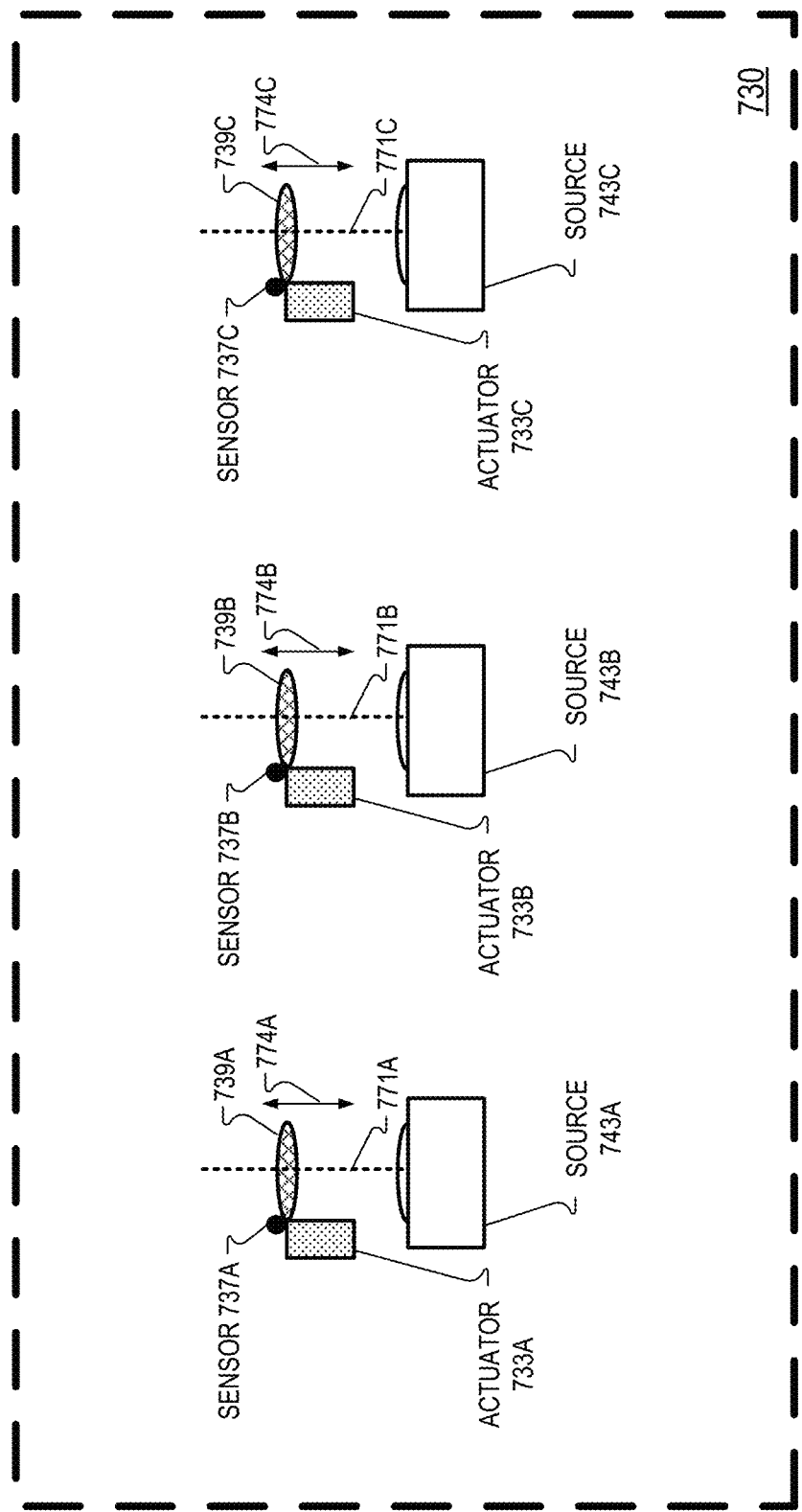
FIG. 7 illustrates an example display that includes three light sources, in accordance with aspects of the disclosure.

FIG. 7 illustrates an example display 730 that includes three light sources 743A, 743B, and 743C, in accordance with implementations of the disclosure. Light sources 743A, 743B, and 743C may be red, green, and blue light sources, respectively. The light sources may include lasers or LEDs, for example. In some implementations of the disclosure, more than one focusing lens in a display may be adjusted along a z-axis for defocus adjustment.

In FIG. 7, focusing lens 739A moves along a z-position 774A of an optical axis of light source 743A to focus illumination light 771A emitted by light source 743A. Temperature sensor 737A may generate a thermal reading of focusing lens 739A and actuator 733A is configured to adjust focusing lens 739A along z-position 774A. Similarly, focusing lens 739B moves along a z-position 774B of an optical axis of light source 743B to focus illumination light 771B emitted by light source 743B. Temperature sensor 737B may generate a thermal reading of focusing lens 739B and actuator 733B is configured to adjust focusing lens 739B along z-position 774B. And, focusing lens 739C moves along a z-position 774C of an optical axis of light source 743C to focus illumination light 771C emitted by light source 743C. Temperature sensor 737C may generate a thermal reading of focusing lens 739C and actuator 733C is configured to adjust focusing lens 739C along z-position 774C. Thus, defocusing adjustments may be made for each light source (and each corresponding wavelength) in a display 730.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "processing logic" in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

Networks may include any network or network system such as, but not limited to, the following: a peer-to-peer network; a Local Area Network (LAN); a Wide Area Network (WAN); a public network, such as the Internet; a private network; a cellular network; a wireless network; a wired network; a wireless and wired combination network; and a satellite network.

Communication channels may include or be routed through one or more wired or wireless communication utilizing IEEE 802.11 protocols, short-range wireless protocols, SPI (Serial Peripheral Interface), I²C (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A head mounted display comprising:
    a display projector assembly configured to present a virtual image to an eyebox region, wherein the display projector assembly includes a focusing lens configured to focus the virtual image to the eyebox region;
    a disparity waveguide configured to receive a portion of image light of the virtual image generated by the display projector assembly;
    a dual-photodiode disparity image sensor configured to capture an adjustment image from the image light propagating in the disparity waveguide; and
    processing logic configured to:
        generate a first defocus factor in response to comparing the adjustment image with a reference image driven onto the display projector assembly;
        generate a second defocus factor in response to an alignment of a first intensity profile of the adjustment image and a second intensity profile of the adjustment image; and
        adjust the focusing lens of the display projector assembly in response to (1) the first defocus factor; and (2) the second defocus factor.

2. The head mounted display of claim 1 further comprising:
    a temperature sensor configured to generate a thermal reading of the focusing lens of the display projector assembly, wherein the processing logic is further configured to:
    generate a third defocus factor in response to thermal reading; and
    adjust the focusing lens in response to the third defocus factor.

3. The head mounted display of claim 1, wherein the adjusting the focusing lens of the display projector assembly is also in response to a position signal generated by a position sensor that senses a position of the focusing lens of the display projector assembly.

4. The head mounted display of claim 1, wherein the display projector assembly includes a first light source, a second light source, and a third light source, and wherein adjusting the focusing lens includes:
    adjusting a first focusing lens along a first optical axis of the first light source, wherein the first focusing lens receives first illumination light from the first light source;
    adjusting a second focusing lens along a second optical axis of the second light source, wherein the second focusing lens receives second illumination light from the second light source; and
    adjusting a third focusing lens along a third optical axis of the third light source, wherein the third focusing lens receives third illumination light from the third light source, the first illumination light, the second illumination light, and the third illumination light having different wavelengths.

5. The head mounted display of claim 4, wherein the first illumination light is red, the second illumination light is green, and the third illumination light is blue.

6. The head mounted display of claim 1, wherein generating the first defocus factor includes:
computing a relative peak signal to noise ratio (PSNR) between the adjustment image and the reference image; and
deriving the first defocus factor from the relative PSNR.

7. The head mounted display of claim 1, wherein adjusting the focusing lens of the display projector assembly includes adjusting the focusing lens along a z-axis with respect to a display of the display projector assembly.

8. The head mounted display of claim 1 further comprising:
a camera lens configured disposed between the disparity waveguide and the dual-photodiode disparity image sensor, wherein the camera lens is configured to focus the portion of image light of the virtual image onto an imaging plane of the dual-photodiode disparity image sensor.

9. The head mounted display of claim 1 further comprising:
a display waveguide configured to receive the image light of the virtual image from the display projector assembly, wherein the disparity waveguide is configured to receive the portion of the image light of the virtual image from the display waveguide.

10. The head mounted display of claim 1, wherein the first intensity profile is generated by first-photodiodes of the dual-photodiode disparity image sensor, and wherein the second intensity profile is generated by second-photodiodes of the dual-photodiode disparity image sensor disposed adjacent to the first-photodiodes.

11. A display assembly comprising:
a display;
a focusing lens configured to focus display light generated by the display;
a dual-photodiode disparity image sensor configured to capture an adjustment image from the display light; and
processing logic configured to:
generate a first defocus factor in response to comparing the adjustment image with a reference image driven onto the display;
generate a second defocus factor in response to an alignment of a first intensity profile of the adjustment image and a second intensity profile of the adjustment image; and
adjust the focusing lens in response to (1) the first defocus factor; and (2) the second defocus factor.

12. The display assembly of claim 11 further comprising:
a temperature sensor configured to generate a thermal reading of the focusing lens, wherein the processing logic is further configured to:
generate a third defocus factor in response to thermal reading; and
adjust the focusing lens in response to the third defocus factor.

13. The display assembly of claim 11, wherein the adjusting the focusing lens is also in response to a position signal generated by a position sensor that senses a position of the focusing lens.

14. A method comprising:
capturing an adjustment image of an image projected by a display projector assembly, wherein the adjustment image is captured by a dual-photodiode disparity image sensor;
generating a first defocus factor in response to comparing the adjustment image with a reference image driven onto the display projector assembly;
generating a second defocus factor in response to an alignment of a first intensity profile of the adjustment image and a second intensity profile of the adjustment image, wherein the first intensity profile is generated by first-photodiodes of the dual-photodiode disparity image sensor, and wherein the second intensity profile is generated by second-photodiodes of the dual-photodiode disparity image sensor disposed adjacent to the first-photodiodes; and
adjusting a focusing lens of the display projector assembly in response to the first defocus factor or the second defocus factor.

15. The method of claim 14 further comprising:
generating a third defocus factor in response to a thermal reading of the focusing lens of the display projector assembly,
wherein the adjusting the focusing lens of the display projector assembly is also in response to the third defocus factor.

16. The method of claim 14, wherein the adjusting the focusing lens of the display projector assembly is also in response to a position signal generated by a position sensor that senses a position of the focusing lens of the display projector assembly.

17. The method of claim 14, wherein adjusting the focusing lens of a display projector includes:
adjusting a first focusing lens along a first optical axis of a first light source, wherein the first focusing lens receives first illumination light from the first light source;
adjusting a second focusing lens along a second optical axis of a second light source, wherein the second focusing lens receives second illumination light from the second light source; and
adjusting a third focusing lens along a third optical axis of a third light source, wherein the third focusing lens receives third illumination light from the third light source, the first illumination light, the second illumination light, and the third illumination light having different wavelengths.

18. The method of claim 17, wherein the first illumination light is red, the second illumination light is green, and the third illumination light is blue.

19. The method of claim 14, wherein generating the first defocus factor includes:
computing a relative peak signal to noise ratio (PSNR) between the adjustment image and the reference image; and
deriving the first defocus factor from the relative PSNR.

20. The method of claim 14, wherein adjusting the focusing lens of the display projector assembly includes adjusting the focusing lens along a z-axis with respect to a display of the display projector assembly.

* * * * *